(12) United States Patent
Liu et al.

(10) Patent No.: US 11,467,866 B2
(45) Date of Patent: Oct. 11, 2022

(54) SCHEDULING FRAMEWORK FOR ORGANIZATION MIGRATIONS

(71) Applicant: salesforce.com, inc., San Francisco, CA (US)

(72) Inventors: Chen Liu, San Mateo, CA (US); Ilya Zaslavsky, Toronto (CA); Alex Ovesea, Maple (CA); Mikhail Chainani, San Francisco, CA (US); Xiaodan Wang, Dublin, CA (US); Sridevi Gopala Krishnan, Foster City, CA (US)

(73) Assignee: Salesforce.com, Inc., San Francisco, CA (US)

( * ) Notice: Subject to any disclaimer, the term of this patent is extended or adjusted under 35 U.S.C. 154(b) by 328 days.

(21) Appl. No.: 15/882,194

(22) Filed: Jan. 29, 2018

(65) Prior Publication Data
US 2019/0235918 A1 Aug. 1, 2019

(51) Int. Cl.
*G06F 9/455* (2018.01)
*G06F 9/46* (2006.01)
*G06F 9/48* (2006.01)
*G06F 3/06* (2006.01)
*G06F 11/34* (2006.01)
*G06F 11/30* (2006.01)

(52) U.S. Cl.
CPC ............ *G06F 9/4856* (2013.01); *G06F 3/067* (2013.01); *G06F 3/0647* (2013.01); *G06F 9/45558* (2013.01); *G06F 11/3006* (2013.01); *G06F 11/3442* (2013.01); *G06F 2009/4557* (2013.01)

(58) Field of Classification Search
CPC .. G06F 9/4856; G06F 9/45558; G06F 3/0647; G06F 3/067; G06F 11/3006; G06F 11/3442; G06F 2009/4557
USPC .......................................................... 718/1
See application file for complete search history.

(56) References Cited

U.S. PATENT DOCUMENTS

| | | | |
|---|---|---|---|
| 6,510,468 B1* | 1/2003 | Hayne | G06F 16/957 715/239 |
| 8,417,973 B2* | 4/2013 | Cooper | G06F 1/3221 713/300 |
| 9,350,682 B1* | 5/2016 | Gupta | G06F 9/45558 |
| 9,361,145 B1* | 6/2016 | Wilson | G06F 9/4881 |
| 10,185,586 B2* | 1/2019 | Kumeta | G06F 9/45558 |
| 10,432,697 B2* | 10/2019 | Singhvi | G06F 16/13 |
| 10,484,297 B1* | 11/2019 | McClenahan | H04L 67/34 |
| 10,673,716 B1* | 6/2020 | Sethuramalingam | H04L 67/16 |
| 2010/0262632 A1* | 10/2010 | Jain | G06F 16/258 707/809 |
| 2011/0302277 A1* | 12/2011 | Baker | G06F 16/27 709/219 |

(Continued)

*Primary Examiner* — Bradley A Teets
(74) *Attorney, Agent, or Firm* — Wong & Rees LLP; Zhichong Gu

(57) ABSTRACT

A request for an organization migration to move application data and application services of an organization hosted at a source system instance in a multi-tenant computing system to a target system instance in the multi-tenant computing system is received. Based on operational parameters, a time window is selected to execute the organization migration. Computing resource usages of one or both of the source and target system instances in the selected time window are monitored. If computing resources are available, the organization migration is enqueued.

15 Claims, 10 Drawing Sheets

(56) References Cited

U.S. PATENT DOCUMENTS

| | | | | |
|---|---|---|---|---|
| 2013/0073731 | A1* | 3/2013 | Bose | G06F 9/5088 |
| | | | | 709/226 |
| 2015/0378766 | A1* | 12/2015 | Beveridge | G06F 9/45558 |
| | | | | 718/1 |
| 2016/0070601 | A1* | 3/2016 | Yamamoto | G06F 9/5088 |
| | | | | 718/105 |
| 2016/0164722 | A1* | 6/2016 | Zhu | H04L 67/02 |
| | | | | 709/221 |
| 2016/0321248 | A1* | 11/2016 | Narayan | G06F 16/214 |
| 2017/0364387 | A1* | 12/2017 | Ahmed | G06F 9/4856 |
| 2019/0065542 | A1* | 2/2019 | Baker | G06F 21/6218 |
| 2019/0235895 | A1* | 8/2019 | Ovesea | G06F 9/45558 |

* cited by examiner

OrganizationMigration_Id*
Organization_Id
SourceInstance
DestInstance
Mode
State
WindowStart
WindowEnd
ConfigParams
OriginalStatus
DELETED*
CREATED_DATE*
CREATED_BY*
LAST_UPDATE*
LAST_UPDATE_BY*
SYSTEM_MODSTAMP*

FIG. 2A

SCHEDULING FRAMEWORK FOR ORGANIZATION MIGRATIONS

TECHNICAL FIELD

The present invention relates generally to organization migrations, and in particular, to a scheduling framework for migrating application data and application services of organizations between computing system instances.

BACKGROUND

A large-scale cloud-based computer system may include multiple datacenters at various geographic locations to maintain millions of sets of application data for millions of organizations as well as provide millions of sets of application services such as those for customer relationship management (CRM), secured data access, online transaction processing, mobile apps, etc., to respective users and/or customers of these organizations.

As the datacenters evolve over time, and as computing resource needs for the organizations evolve over time, at least some of the organizations may be relocated or migrated between computing instances of the same datacenter or even different datacenters.

Organization migrations may be carried out through close and intensive human supervision from experts experienced in various aspects relating to migrating application data and application services in the data centers. Even if these experts could be available during entire time periods of organization migrations, a large amount of manual input and human supervision may lead to inefficiencies, errors, lack of transparency, degradations, system resource contentions, prolonged downtimes, and even failures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A illustrates a migration schedule record.

DESCRIPTION OF EXAMPLE EMBODIMENTS

Figure 1A:
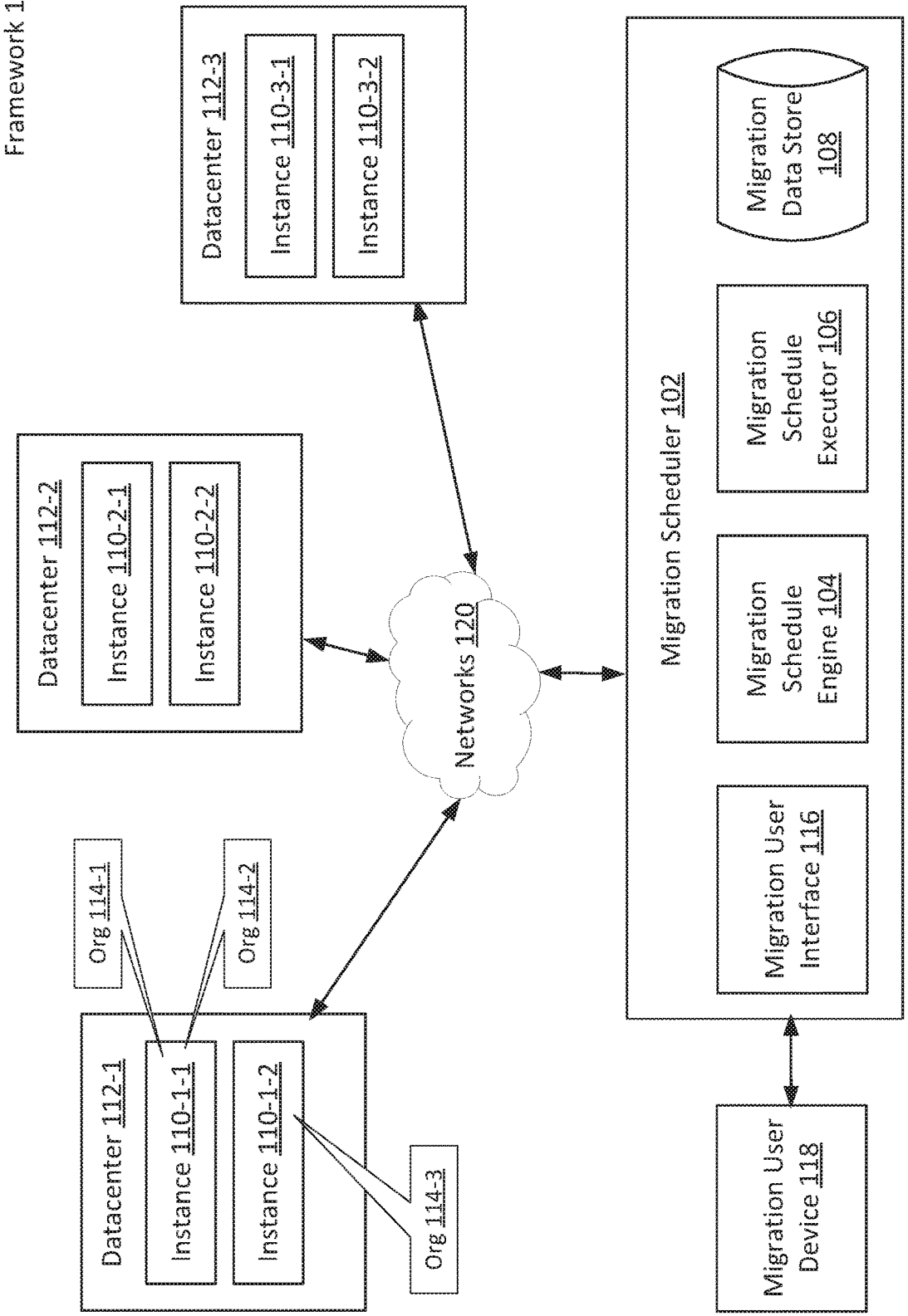
FIG. 1A illustrates an example overall organization migration framework for migrating organizations.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
2.1. Scheduling or Enqueuing Organization Migrations
2.2. Multiple Application Servers
2.3. Multiple Database Nodes
3.0. Example Embodiments
4.0 Implementation Mechanism—Hardware Overview
5.0. Extensions and Alternatives

1.0 GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein can be used by a migration scheduler to schedule and enqueue (e.g., mass, etc.) organization migrations each of which moves both application data and application services of an organization (or tenant) from one system instance of a computing system to another system instance of the computing system. The migration scheduler can interact with a migration orchestration engine to carry out a plurality of organization migrations within a selected time window such as a relatively short downtime window, and so forth. Examples of migration orchestration engines can be found in U.S. patent application Ser. No. 15/882,233, with an application title of "ORCHESTRATION ENGINE" by Alex Ovesea, Ilya Zaslaysky, Chen Liu, Alan Arbizu, Mikhail Chainani, Xiaodan Wang and Sridevi Gopala Krishnan, filed on Jan. 29, 2018, the entire contents of which are hereby incorporated by reference as if fully set forth herein.

Organization migrations as described herein represent a part of normally planed operations in the computing system—which may host a relatively large number of organizations or tenants—to migrate some or all of the hosted organizations efficiently, automatically and accurately with little human intervention in the selected time window. Additionally, optionally or alternatively, the organization migrations can be performed with better load balancing and performance tuning than under other approaches that do not implement techniques as described herein. The selected time window represents a normally planned shutdown time period that affects only the organizations (e.g., locks out users and/or customers of the organization, allows only read-only access, etc.) being migrated in the selected time window and does not affect any other organizations (hosted in the source and target system instances) that are not migrated during the selected time window.

It should be noted that organization migrations as described herein can operate in conjunction with other system functions relating to data backup, fault tolerance and/or high availability of the system instances and the datacenters, but there is no need for the organization migration to be used to directly provide these other system functions.

An organization migration as described herein moves (e.g., entire hosted, etc.) application data and application services of an organization from a first point of deployment (POD) such as a source system instance in a datacenter to another POD such as a target system instance in the same or a different datacenter in the selected time window in which the application data and application services based at least in part on the application data may be temporarily unavailable (but may still provide read-only access in some embodiments) to users and/or customers of the organization. However, all other organizations or tenants hosted in the source system instances and/or the target system instance, which are not migrated in the selected time window, are not affected under techniques as described herein. In other words, users and/or customers of these other organizations can access their respective application data and their respective application services normally, without even being able to notice any concurrent organization migrations are being performed from the source system instance to the target system instance in the selected time window.

At the end of the organization migration (e.g., within the selected time window, etc.), the application data and the application service of the organization are no longer provided from the source system instance, but rather are provided from the target system instance. In other words, before the organization migration, the source system instance hosts the application data and the application services of the organization and provides computing resources to the organization, while the target system instance is not involved in providing computing resources to the organization. After the organization migration, the target system instance hosts the application data and the application services of the organization and provides computing resources to the organization, while the source system instance is no longer involved in providing any computing resources to the organization. Users and/or customers of the migrated organization can access the pre- and post-migration application data and services at user and application levels essentially in the same manner before and after the selected time window.

A migration user, who may be an operator, an administrator, an authorized user, a designated user, etc., for requesting and monitoring organization migration(s), can send or issue a request for a specific organization migration, for example through a web portal or an organization migration web page, to the migration scheduler. Operational parameters of the organization migration and/or migration configuration data at least a part of which may be carried/embedded within the request and at least a part of which may be collected from the source and target system instances can be validated.

For a single-phase organization migration, migration specific actions (or migration steps) can be (e.g., entirely, largely, etc.) performed within a selected time window. For a dual-phase organization migration, some (e.g., non-critical, etc.) migration specific actions can be performed, before the selected time window, while some or all of application data and application services of an organization in the migration are still be accessible (e.g., read-only for some and read-and-write for others, etc.) to users and/or customers of the organization being migrated; some (e.g., service/access impactful, etc.) migration specific actions can be performed, within the selected time window, while the application data and the application services of the organization in the migration become (e.g., largely, entirely, etc.) non-accessible (e.g., except for read-only access in some embodiments, etc.) to the users and/or customers of the organization.

Computing resource usages and progresses of any ongoing organization migrations can be monitored before, during and/or after the selected time window. Organization migrations requested to be performed with the selected time window can be enqueued and performed efficiently and optimally with throttling, to avoid overloading (which could ultimately delay or negatively impact the migrations) the system instances (or computing resources therein) and performance degradation (e.g., too many retries, frequent stop-and-go, etc.) of the system instances. If the computing resource usages are available in the system instances, then the migration scheduler can interact with the migration orchestration engine to continually carry out more and more requested organization migrations scheduled for the selected time window, including automatically scheduling, enqueuing and executing any pre-migration steps (or migration steps before the selected time window) and/or post-migration steps (or migration steps after the selected time window) in connection with these organization migrations. Examples of resource usage monitoring and migration flow control can be found in U.S. patent application Ser. No. 15/882,266, with an application title of "MIGRATION FLOW CONTROL" by Ilya Zaslaysky, Mikhail Chainani, Alex Ovesea, Vijay Devadhar, Xiaodan Wang and Alan Arbizu, filed on Jan. 29, 2018, the entire contents of which are hereby incorporated by reference as if fully set forth herein.

In some embodiments, the organization migrations scheduled to be migrated in the selected time window can be enqueued in batches at different time points in the selected time window. The migration user can schedule, reschedule, update, modify and delete migrations at a single user interface (e.g., a top webpage, etc.). The same user interface can be used by the migration user to monitor progresses/statuses of one or more organization migrations and/or perform actions (e.g., repeat for another selected time window, ignore a failed migration step, etc.).

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 FUNCTIONAL OVERVIEW

FIG. 1A illustrates an example overall organization migration framework 100 for migrating organizations hosted in a computing system. Example computing systems that implement the organization migration framework (100) may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks 120.

In some embodiments, the computing system that hosts the organizations may comprise a plurality of datacenters such as 112-1, 112-2, 112-3, etc., which may be located at the same or different geographic locations such as the same or different continents, the same or different countries, the same or different states, the same or different regions, and so forth.

Each data center may implement a set of system instances to host respective organizations. These organizations may contract with the owner of the computing system such as a multi-tenant computing system to host their respective (e.g., organization-specific, organization-common, etc.) application data, to provide their (e.g., organization-specific, organization-common, etc.) application services to their respective users and/or customers. Examples of application data may include, but not necessarily limited to only, organization-specific application data, organization-common application data, application configuration data, application data, application metadata, application code, etc., specifically generated or configured for (e.g., organization-specific, organization-common, etc.) application services of an individual organization.

As used herein, the term "organization" may refer to some or all of (e.g., complete, original, a non-backup version of, a non-cached version of, an online version of, original plus one or more backup or cached copies, an online version plus one or more offline versions of, etc.) application data of an organization hosted in the computer system and application services of the organization based at least in part on the application data.

As illustrated in FIG. 1A, each datacenter (e.g., 112-1, 112-2, 112-3, etc.) may comprise a set of one or more system instances. A first datacenter 112-1 comprises first system instances 110-1-1, 110-1-2, etc.; a second datacenter 112-2 comprises second system instances 110-2-1, 110-2-2, etc.; a third datacenter 112-3 comprises third system instances 110-3-1, 110-3-2, etc.

Each system instance (e.g., 110-1-1, 110-1-2, 110-2-1, 110-2-2, 110-3-1, 110-3-2, etc.) in the hosting computing system can host up to a maximum number of organizations such as 5,000 organizations, 10,000 organizations, 15,000+ organizations, etc. As illustrated in FIG. 1A, the system instance (110-1-1) in the datacenter (112-1) may host a first organization 114-1 and a second organization 114-2, among others; the system instance (110-1-1) in the datacenter (112-1) may host a third organization 114-3, among others.

The migration framework (100) can be used to provide reliable, flexible and scalable organization mobility (e.g., capability to perform mass organization migration, etc.) in the computer system. In some embodiments, organization migrations can be performed fully automatically. In some embodiments, a migration user can choose to specify and perform a (e.g., large, etc.) a part of an organization migration automatically with some manually performed migration steps (or migration specific actions). Statuses of manually performed migration steps can be automatically incorporated and taken into account by a schedule engine as described herein while the automatically performed part of the organization migration are being scheduled, enqueued and performed automatically. Thus, the organization migration framework (100) can be used to avoid a manual, lengthy, complicated organization migration process that relies on relatively heavy cross-discipline involvement and cooperation from different personnel and teams over a relatively long time period such as months to plan, enqueue, execute, monitor, activate, rollback, etc.

A migration user such as an operator, an administrator, an authorized user, a designated user, and so forth, can use a migration user device 118 to enter or send a request for an organization migration to a migration scheduler 102 through a migration user interface 136. The migration user device (118) may be operatively linked to, and communicate with, the migration scheduler (102) through one or more networks (e.g., 120, etc.) or via a local data connection.

Upon receiving the request for the organization migration, the migration scheduler (102) can automatically schedule the requested organization migration to be automatically (e.g., fully automatically, automatically with manual steps specified or performed by a migration user, etc.) executed at least in part through a preparation time window, a downtime window, etc., selected for the organization migration. For the requested organization migration, the migration scheduler (102) may identify a specific organization (e.g., the first organization (114-1), etc.) to be migrated, a source target instance (e.g., the system instance (110-1-1) in the first datacenter (112-1), etc.), a target system instance (e.g., the system instance (110-2-1) in the second datacenter (112-2), etc.), the preparation time window (e.g., a start time, an end time, etc.), the downtime window (e.g., a start time, an end time, etc.), migration configuration data, any other operational parameters set forth for the requested organization migration, etc. Some or all of the foregoing may be specified in the request for the organization migration. Some or all of the foregoing may be obtained from the source and target system instances for the organization migration. Some or all of the foregoing may be stored as migration configuration data for the requested organization migration in a migration data store 108 in the migration scheduler (102).

In some embodiments, the migration scheduler (102) continually monitors computing resource usages of some or all of the system instances in the datacenters of the (e.g., multi-tenant, etc.) computing system, including but not limited to monitoring computing resource usages of one or both of the source system instance (110-1-1 in the present example) and the target system instance (110-2-1 in the present example) before, during and/or after the preparation time window, the downtime window, etc., selected for carrying out various migration specific actions.

The migration scheduler (102) determines, based at least in part on the monitored computing resource usages, whether computing resources are available for performing respective migration specific actions in the requested organization migration in the preparation time window, the downtime window, etc., selected for carrying out various migration specific actions. If so, the migration schedule engine (104) operates with a migration schedule executor 106 to enqueue the migration specific actions for the requested organization migration in the selected preparation time window, the selected downtime window, etc. For example, the migration schedule engine (104) can interact with the migration schedule executor (106) to cause a migration execution engine to perform pre-migration steps in the preparation time window, to perform migration specific actions in the downtime window, etc. These migration specific actions automatically (e.g., fully automatically, automatically with manual migration steps specified or performed by a migration user, etc.) move application data and application services of the organization from the source system instance (110-1-1) to the target system instance (110-2-1), thereby causing the organization to be migrated from the source system instance (110-1-1) or the first datacenter (112-1) to the target system instance (110-2-1) or the second datacenter (112-2) with no or minimal/minor human intervention (e.g., in normal operational scenarios, etc.).

Additionally, optionally or alternatively, as a part of the organization migration, the migration specific actions automatically (e.g., fully automatically, automatically with a manual part specified or performed by a migration user, etc.) performed under techniques as described herein can cause system configuration data, system data, system metadata, system code, etc., to be (e.g., fully automatically, with minimal manual input, etc.) generated and deployed in connection with the target system instance (110-2-1) and/or the target datacenter or the second datacenter (112-2) in the present example. As used herein, system configuration data, system data, system metadata, system code, etc. refers to system-level data and/or system-level services used to store, access, or manipulate the application data for the organization, to enable the application services, etc.

2.1. Scheduling or Enqueuing Organization Migrations

Figure 1B:
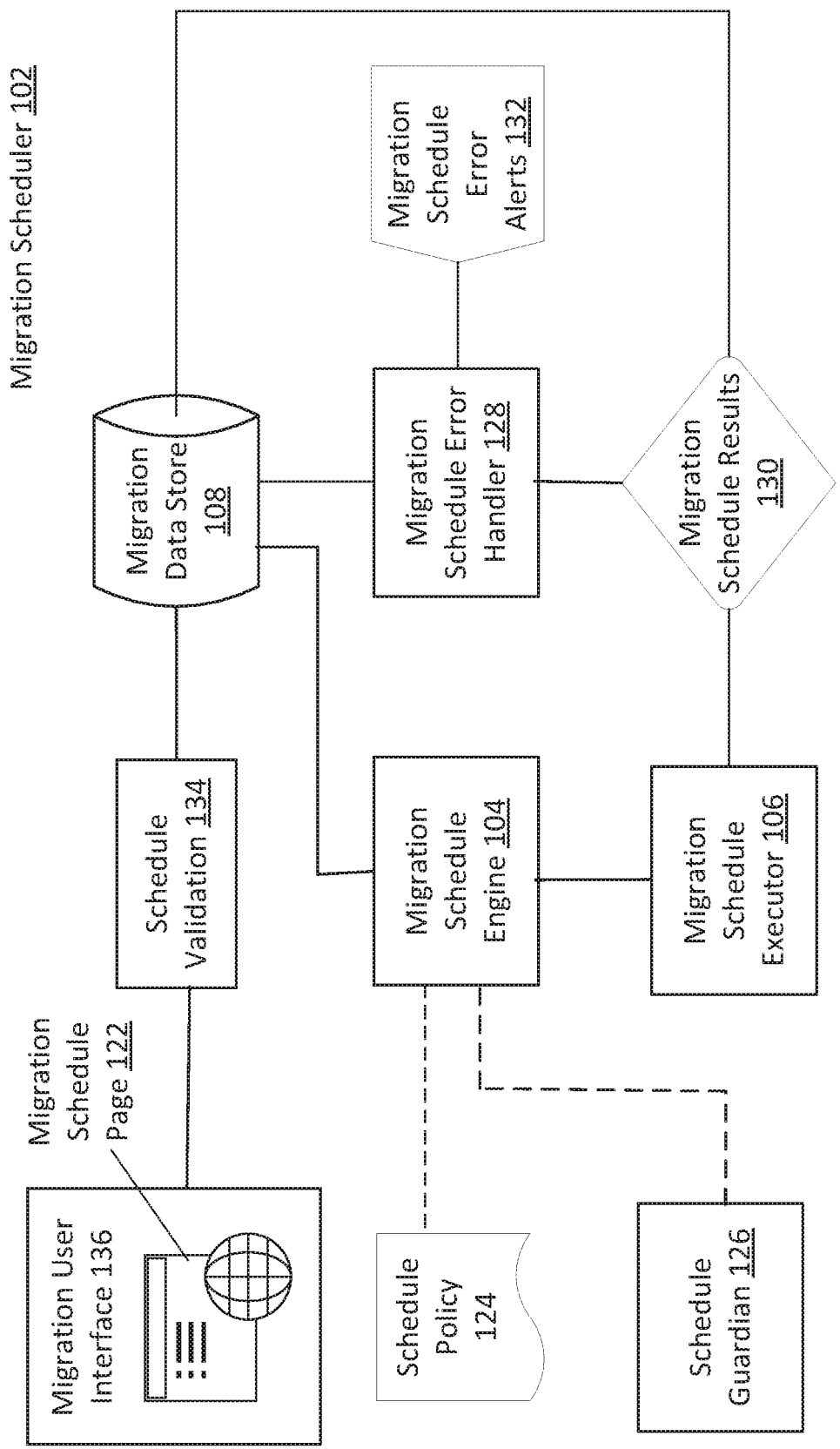
FIG. 1B illustrates an example flowchart for scheduling/enqueuing migrating organizations.

FIG. 1B illustrates an example flowchart for scheduling/enqueuing migrating organizations hosted in a computing system. Some or all of the components as described herein may be implemented by one or more computing devices, and communicatively linked through data connections, networks, and so forth.

A migration schedule page 122 may be displayed to a user (e.g., an operator, an administrator, an authorized user, a designated user, etc.) through a migration user interface (e.g., 136, etc.) to enter or send a request for an organization migration to causes the requested organization migration to be scheduled beforehand. The request may be represented by a message that may include, but are not necessarily limited to only, any of: an organization identifier for the requested organization migration, a destination system instance, migration start and end times (e.g., as preferred by the user, of a time block such as a weekend or early wee hours in the morning, the earliest time selected by the system automatically, etc.), migration configuration data (e.g., skipping HBase, disable Message Queue priority, use slicing, phase, etc.), and so forth.

The migration schedule page (122) provides a portal (e.g., a web-based portal, a migration web page, etc.) for users to manage scheduled organization migrations. Through the same display page, a user can enter or modify a request for an organization migration, monitor migration scheduling/enqueuing operations and migration step execution as related to a specific organization migration among all organization migrations processed by the migration scheduler (102), intervene in case of any failures or errors encountered in migration scheduling/enqueuing operations or in migration step execution operations, etc., receive final statuses of the requested organization migrations, repeat some or all failed migration steps and/or failed organization migrations, etc. For example, the migration schedule page (122) can show what currently scheduled organization migrations are and what their respective current states are. Users can cancel specific scheduled migrations by organization identifiers through the migration schedule page (122). Additionally, optionally or alternatively, a user can cancel a set of scheduled organization migrations in bulk.

In some embodiments, the migration schedule page (122) may implement or invoke a scheduler validation operator 134 to ensure that information in the request for the organization migration is valid and/or feasible before submitting and confirming the request for the organization migration for the purpose of scheduling or enqueuing the requested organization migration. Example schedule validation operations performed on the information in the request for the organization migration may include, but are not necessarily limited to only, any of: whether the organization identifier is valid, whether there is any duplicate of such a request, whether any downtime window is correctly specified or selected, and so forth. By way of example but not limitation, before proceeding to schedule each organization migration, the scheduler validation operator (134) validates whether the organization (as specified by the organization identifier) is in a valid source system instance, whether the target system instance to which the organization is to be migrated is valid, whether the (e.g., current, etc.) state of the organization is in one of one or more states (e.g., "active", "demo", "free", etc.) permitting organization migration, whether the requested organization migration can be expected to be finished in a downtime window based on estimation data (e.g., using measurements or performance data collected from past organization migrations, etc.), whether all organization migrations scheduled in the downtime window can be completed within resource limits (e.g., limits in processes and/or threads, read/write IO limits, network bandwidth limits, etc.), and so forth.

Some organization migrations may be performed as dual-phase migrations. In a dual-phase migration, some migration specific actions may be performed in a live phase (e.g., some or all application services of the organization to be migrated are available and operating, etc.) in a preparation time window; some migration specific actions may be performed in a dead phase (e.g., some or all application services of the organization to be migrated are not available or operating, etc.) in a downtime window. Before proceeding to schedule each dual-phase organization migration, the scheduler validation operator (134) validates whether the start time of a preparation time window for an estimated live phase for the requested dual-phase organization migration has not yet passed. In some embodiments, the preparation time window may be determined or estimated based at least in part on information (e.g., as specified by a migration user, determined based on configurable live tables, etc.) about what application data (e.g., stored in database tables, etc.) is available for read-only access (e.g., in the preparation window, etc.) and what application data is to be available for read-and-write access. A live configurable table that is used to tune which data tables have read-only access and which data tables have read-and-write access may be accessed to determine or estimate sizes of these data tables individually and migration times for these tables.

Additionally, optionally or alternatively, a live-phase/dead-phase estimation model can be developed or built with past performance data (or historic data) collected from previously performed organization migrations The information about application data that is available for read-only access or that is available for read-write access and/or the estimation model may be used to determine the preparation time window such as start and end times.

In response to determining that a request for an organization migration fails in any of the validation operations, a migration schedule validation error (e.g., with detail information, etc.) may be displayed/provided on the migration schedule page (122).

On the other hand, in response to determining that the request for the organization migration succeeds in (e.g., all, etc.) the validation operations, validated information for the requested organization migration may be stored in the migration data store (108), for example in a migration schedule record representing the requested organization migration.

As illustrated in FIG. 2A, a migration schedule record as described herein may comprise a number of user-specified and/or system generated fields with values specified by the user, including but not limited to some or all of: an organization identifier for an organization to be migrated (denoted as "organization_Id"), a source system instance at which the organization is currently hosted (denoted as "SourceInstance"), a target system instance to which the organization is to be migrated (denoted as "DestInstance"), a migration mode such as a single-phase migration mode or a dual-phase migration mode (denoted as "Mode"), a migration state such as "Scheduled" and so forth (denoted as "State"), a start time of a downtime window (denoted as "WindowStart"), an end time of the downtime window (denoted as "WindowEnd"), migration configuration parameters (denoted as "ConfigParams"), an original status of the organization before the shutdown window (denoted as "OriginalStatus"), etc.

The original status of the organization before the shutdown window by a migration scheduler as described herein to remember what status the organization is in before an organization migration moves the organization from the source system instance to the target system instance. In the dead-phase of a dual-phase migration or in a single-phase migration, users and/or customers of the organization may be locked out, and prevented from accessing application data and application services of the locked-out organization. Once the organization migration is completed and the organization is activated to provide the application data and the application services as migrated, the organization is restored to the original status as indicated by the "OriginalStatus" field. It should be noted that while organizations involved in organization migrations being carried out can be locked out in the source system instance, other organizations other than those involved in the organization migrations can still operate normally on the source system instance as well as the target system instance and can provide access to their respective application data and their respective application services to users and/or customers of these other organizations without even noticing that there are concurrently performed organization migrations.

Migration configuration parameters may be related to components (e.g., to skip one or more components in a requested organization migration, to include one or more components in a requested organization, etc.) such as specific application data components and/or specific application/database service components, etc.

An organization to be migrated (in an organization migration) may comprise various components (e.g., HBase, FileForce or FFX, etc.) each of which contains application data and application services that are to be migrated as a part of an organization migration. As used herein, a component (e.g., a to-be-migrated component, a component represented by a migration component object, etc.) refers to a system of record (among one or more systems of records in the to-be-migrated organization) that contains its respective application data (e.g., organization-specific application data, organization-common application data, customer data, FFX, HBase, etc.) and/or its respective application services (e.g., organization-specific application services, organization-common application services, customer applications, mobile aps, cloud-based applications, backend program logics, etc.) that need to be migrated from a source system instance to a target system instance as part of an organization migration (or customer migration).

Example components may include, but are not necessarily limited to only, any relating to or operating with one or more of: relational databases (e.g., Oracle databases, etc.), object relational databases, file-based databases (e.g., HBase, etc.), secured data (e.g., encrypted data, etc.), etc. A migration user can choose to skip or include specific components, set forth general branches and/or tunable parameters in an organization migration, choose which components are to be automatically migrated and which are to be manually migrated, etc. In a non-limiting example, a configuration parameter may be used to disable message queue priority in the shutdown window for organizations involved in the migrations; in normal operating operations, message queue priority (e.g., a data chunk of a relatively high priority in a later message may be processed before an earlier message is processed) may be enabled in normal operations when the organizations are not in migration.

Additionally, optionally or alternatively, the migration schedule record may comprise a number of system-specified fields with values specified by the system (e.g., the migration scheduler (102), etc.), including but not limited to some or all of: a unique identifier for a requested organization migration (denoted as "organizationMigration_Id*"), a number of fields provide an audit trail for creation, modification and deletion of the requested organization migration (e.g., fields denoted as "DELETED*", "CREATED_DATE*", "CREATED_BY*", "LAST_UPDATE*", "LAST_UPDATE_BY*", "SYSTEM_MODSTAMP*", etc.).

Figure 2B:
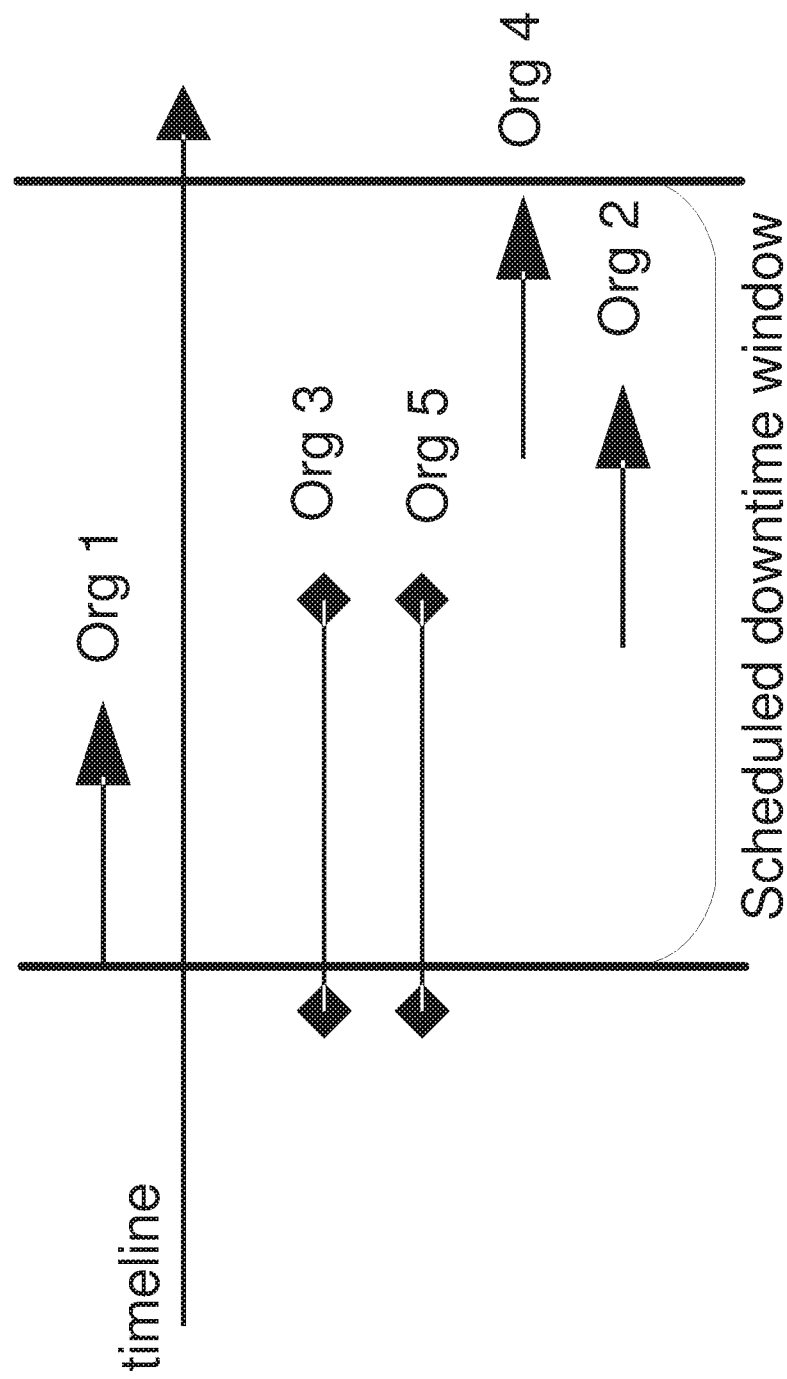
FIG. 2B illustrates a graphic representation of example organization migrations.

FIG. 2B illustrates a graphic representation of example requested migrations of organizations (denoted "Org 1" through "Org 5"). The organization migrations involving "Org 1," "Org 2," "Org 4," etc., may be specified as single-phase migrations. A complete set of migration specific actions for each single-phase migration may be performed in a scheduled downtime window. The organization migrations involving "Org 3," "Org 5," etc., may be specified as dual-phase migrations. A subset of migration specific actions for each dual-phase migration may be performed before the start time of the scheduled downtime window, while some or all of the remaining migration specific actions for each such dual-phase migration may be performed in the scheduled downtime window.

In some embodiments, at the time of creation, the migration schedule record may be set to an initial state "Scheduled" among a plurality of states for the requested organization migration. The requested organization migration is expected to undergo further state changes while the requested organization migration is enqueued and executed (e.g., in a single phase, in multiple phases, etc.), and becomes ready for activation. In some embodiments, the migration scheduler (102), or the schedule validation operator (134) therein, determines whether a user specifies (e.g., on the migration schedule page (122), etc.) a single-phase migration or a dual-phase migration for the requested organization migration.

Figure 2C:
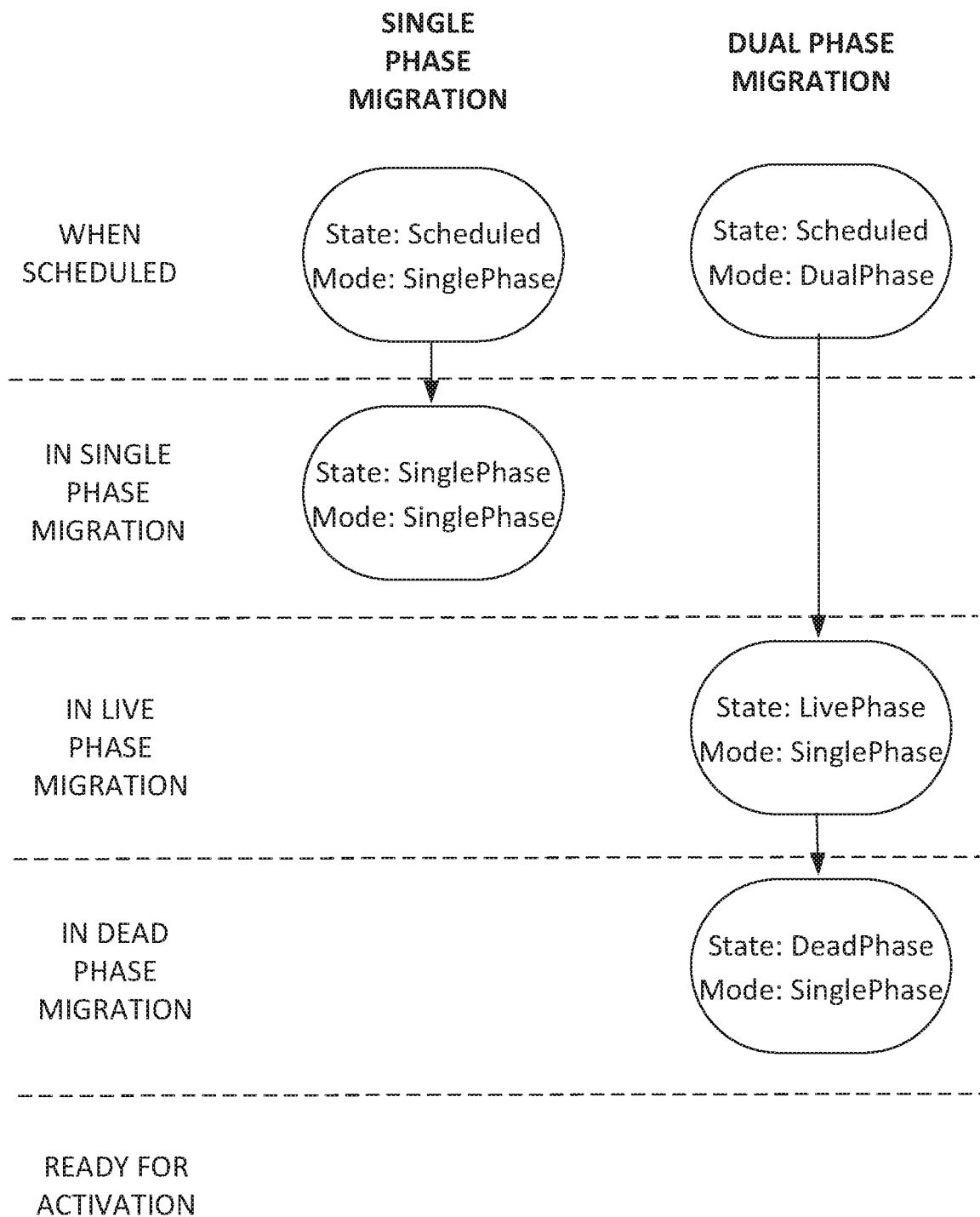
FIG. 2C illustrates example single-phase and dual-phase organization migrations.

As illustrated in FIG. 2C, in response to determining that a single-phase migration is specified for the requested organization migration, the migration scheduler (102), or the schedule validation operator (134) therein, can set a mode "SinglePhase" for the requested organization migration in the migration schedule record representing the requested organization migration in addition to the migration schedule record being set to the initial state "Scheduled". Additionally, optionally or alternatively, the migration scheduler (102), or the schedule validation operator (134) therein, can specify a downtime window (e.g., start and end times, etc.) in the migration schedule record for the requested organization migration. The migration scheduler (102), or the migration schedule engine (104) therein, can start an enqueuing process when the start time of the downtime window time arrives, and update the state of the requested organization migration from "Scheduled" to "SinglePhase".

As illustrated in FIG. 2C, in response to determining that a dual-phase migration is specified for the requested organization migration, the migration scheduler (102), or the schedule validation operator (134) therein, can set a mode "DualPhase" for the requested organization migration in the migration schedule record representing the requested organization migration in addition to the migration schedule record being set to the initial state "Scheduled". Additionally, optionally or alternatively, the migration scheduler (102), or the schedule validation operator (134) therein, can specify a dual-phase downtime window (e.g., start and end times, etc.) in the migration schedule record for the requested organization migration. The migration scheduler (102), or the migration schedule engine (104) therein, can calculate a start time for a live phase of the requested organization migration, and update the state of the requested organization migration from "Scheduled" to "LivePhase" at the start time of the live phase.

At the start time of the dual-phase downtime window (or the dead phase), the migration scheduler (102), or the migration schedule engine (104) therein, can kick off the dead phase of the requested organization migration, and update the state of the requested organization migration from "LivePhase" to "DeadPhase".

At a planned time (e.g., a start time of a downtime window, etc.) for organization migrations, the migration scheduler (102), through the migration schedule engine (104) and a migration schedule executor (e.g., 106, etc.) therein, automatically kick off an enqueuing process for requested organization migrations selected from the migration data store (108). For example, the migration schedule engine (104) may be implemented or configured as cron jobs (e.g., on the source system instance, at a datacenter, etc.) to run periodically every time period (e.g., 1 minute, 3 minutes, 5 minutes, 10 minutes, etc.). The migration schedule engine (104) may query the migration data store (108) (e.g., periodically within each downtime window, at a start time of each downtime window, etc.) for any migration schedule records representing requested organization migrations to be enqueued in a (e.g., etc.) time window such as a (e.g., current, etc.) downtime window, etc. In response to finding the requested organization migrations to be enqueued in the time window, the migration schedule engine (104) can generate migration schedule objects (e.g., in memory, in shared memory of a system instance, etc.) based on the retrieved migration schedule records and start an enqueuing process for the requested organization migrations.

Migration schedule records representing the requested organization migrations can be fetched from the migration data store (108) based on one or more query predicates. The query predicates may specify that start times of downtime windows as specified in the migration schedule records are no later than the current (e.g., system, wall clock, etc.) time, end times of the downtime windows are no earlier than the current (e.g., system, wall clock, etc.) time, and so forth. The query predicates may further specify that the states of the organization migrations as represented by the migration schedule records are currently set to "Scheduled" (or an equivalent state such as "LiveOnSource" for single-phase organization migrations) and the modes of the organization migrations as represented by the migration schedule records are currently set to "SinglePhase", or that the states of the organization migrations as represented by the migration schedule records are currently set to "LivePhase" and their modes are set to "DualPhase".

The migration schedule engine (104) uses the migration schedule records requested organization migrations to generate efficient and optimal migration plans for the set of requested organization migrations to achieve high successful organization migrations at a relatively high throughput or completion rate. At the same time, these techniques provide flexibility in how requested organization migrations can be partitioned or aggregated into different batches. For example, the migration schedule engine (104) may uses a schedule policy 124 to partition or aggregate the requested organization migrations into the different batches. The schedule policy (124) can be configured or developed to prioritize some requested organizations over others, some types of requested organizations over other types, and so forth. The schedule policy (124) can be configured or developed to specify one or more default types of implementations to carry out some if not most of the requested organization migrations. The schedule policy (124) can be configured or developed to specify different or customized implements to carry out some organization migrations. Depending on what are to be achieved or optimized in the organization migrations, the schedule policy (124) can be specifically configured, developed, updated, edited, and so forth, to accomplish a set of migration objectives including but not limited to optimize migration plans, reduce adverse impacts on application services, and/or increase the throughput or completion rate of successful organization migrations.

Organization migrations, for example in one or more batches, can be (at least partially) overlapped in time. Organization migrations optimal for different factors such as different time intervals in a shutdown window can be selected and grouped. For example, same or similar start and end times can be used to batch organization migrations in a specific batch. Some organizations or their organization migrations may be more important than others; thus, these organization migrations may be batched and/or scheduled/enqueued earlier than the others. Organizations that are of roughly the same size and/or around the same start and/or end times, then these organizations can be candidates to be grouped in the same batch. Thus, in some embodiments, start and end times as specified in requests for organization migrations may not be exact times at which the organization migrations are to be started and end. Rather, actual start and end times of any organization migrations may vary from these specified times and may be set based on actual runtime conditions. In a non-limiting example, a relatively high priority organization, or a very large organization, may be scheduled to enqueue relatively early in a scheduled shutdown window so that the related organization migration can be completed within the scheduled shutdown window. In contrast, lower priority organizations, or smaller organizations, may be scheduled to enqueue relatively late in the scheduled shutdown window.

In some embodiments, a relative large number of organization migrations are to be performed during a downtime window. Empirical studies shown that the completion rate for (e.g., successful, etc.) organization migrations could be (e.g., significantly, etc.) affected or lowered if all the organization migrations are enqueued at the beginning of the downtime window.

To optimize enqueuing a relatively large number of organization migrations without overloading the source and target system instances hosting organizations and causing performance degradation, the relatively large number of organization migrations can be divided or partitioned into a plurality of organization migration batches based at least in part on the schedule policy (124). The plurality of organization migration batches does not have to be enqueued at the same time such as the start time of the same downtime window or the start time of a time interval (e.g., cron job time interval, etc.). Rather, each batch in the plurality of organization migration batches can be enqueued at a different time in the same downtime window.

In some embodiments, requested organization migrations (e.g., from the same source system instance to one or more target system instances, etc.) are divided or partitioned into different batches in the plurality of organization migration batches. The batching of the requested organization migrations may be performed based at least in part on their respective estimated data sizes and estimated migration times, estimated computing resource usages of the source and target system instances involved in the requested organization migrations, distribution patterns of requested organization migrations over all the involved system instances and underlying database nodes or partitions, and so forth. The estimated computing resource usages may include, without limitation, those of underlying database nodes (e.g., real application cluster or RAC nodes, etc.) that provide database services for application servers to access application data or other related data in designated database partitions.

In some embodiments, the migration scheduler (102), through the migration schedule engine (104), the migration schedule executor (106) and a migration schedule guardian 126 therein, kicks off enqueuing a (e.g., the very first, etc.) batch in the plurality of organization migration batches, and continuously (e.g., before, during and/or after kicking off enqueuing the batch of organization migrations, etc.) monitors computing resource usages of the source system instance and one or more target system instances involved in all kicked off batches including but not limited to the batch of requested organization migrations.

Example computing resource usages include, but are not necessarily limited to only, MQ depths, etc. For example, if the MQ depth at a target system instance is determined to be below a maximum MQ depth threshold, the migration schedule engine (104) may enqueue further organization migrations from the source system instance to the target system instance. Additionally, optionally or alternatively, some or all of other indicators such as the total number of current threads, the total number of current processes, the total number of current I/O operations, etc., at one or both of the source system instance and the target system instance may be used by the migration schedule engine (104) to determine whether further organization migrations may be enqueued from the source system instance to the target system instance.

In some embodiments, the migration scheduler (102) determines whether the computing resource usages are no more than maximum computing resource usage thresholds (e.g., by way of migration traffic lights generated based on resource measurements, etc.). More specifically, the schedule guardian (126) in the migration scheduler (102) can be implemented with software, hardware, a combination of software and hardware, etc., to monitors computing resource usages of some or all of the system instances in datacenters of a (e.g., multi-tenant, etc.) computing system in which organizations such as those involved in organization migrations.

In response to determining that the computing resource usages are no more than the maximum computing resource usage thresholds (e.g., by way of receiving no red migration traffic lights, etc.), the migration scheduler (102) kicks off enqueuing the next batch in the plurality of organization migration batches, and continuously (e.g., before, during and/or after kicking off enqueuing the next batch of organization migrations, etc.) monitors computing resource usages of the source system instance and all target system instances involved in all kicked off batches including but not limited to the batch of requested organization migrations.

On the other hand, in response to determining that the computing resource usages are more than the maximum computing resource usage thresholds (e.g., by way of receiving at least one red migration traffic lights, etc.), the migration scheduler (102) continuously monitors computing resource usages of the source system instance and all target system instances involved in all kicked off batches, and waits for the computing resource usages to drop at or below the maximum computing resource usage thresholds (e.g., by way of receiving a set of continuous green migration traffic lights, etc.) to kick off further enqueuing batches in the plurality of organization migration batches.

In some embodiments, the migration scheduler (102), through the migration schedule engine (104) and the migration schedule executor (106) therein, sets or adjusts a cadence (e.g., frequency, number, etc.) of enqueuing the requested organization migrations to avoid, or reduce the likelihood of, overwhelming or overloading the computing system or any part therein, caused by over-scheduling organization migrations beyond some resource limits in the computing system, while generating optimal and productive organization migration completion.

In a non-limiting implementation example, the schedule guardian (126) is implemented to receive (as input) computing resource usage measurements (or migration traffic lights) from the system instances involved in the organization migrations and produce a single Boolean value indicating whether further requested organization migrations can be enqueued at a given time. The migration scheduler (102) may perform a schedule run (or cycle) in each time interval in a plurality of time intervals that cover the downtime window. In each schedule run, the schedule engine (104) consults or interacts with the schedule guardian (126) to determine whether further requested organization migrations can be enqueued at the (current) schedule run/cycle.

To avoid overloading the source and target system instances while maintaining an optimal and productive completion rate of organization migrations, time frequencies of schedule runs/cycles and/or the total number of requested organization migrations to be scheduled per schedule run/cycle (or per batch) can be pre-configured, dynamically configured, adaptively tuned, etc.

In response to determining that further requested organization migrations cannot be enqueued at the (current) schedule run/cycle, the schedule engine (104) skips this schedule run/cycle and waits for the next schedule run/cycle to determine whether further requested organization migrations can be enqueued at the next schedule run/cycle.

On the other hand, in response to determining that further requested organization migrations can be enqueued at the (current) schedule run/cycle, the schedule engine (104) can interact with the schedule executor (106) to enqueue a current batch of selected organization migrations. The schedule engine (104) may be implemented as an object, method, or thread, that can be created or spawned off by the schedule engine (104). Migration plans generated based on migration schedule records representing the selected organization migrations in the current batch can be passed as input to the schedule executor (106). The schedule executor (106) may be configured to operate with a migration request processor (not shown) to enqueue the current batch of the selected organization migrations as a single batch with same settings (e.g., same or similar configuration parameters, etc.), or to enqueue the selected organization migrations individually (or one by one) with different settings (e.g., distinct configuration parameters per organization migration, etc.). In case of encountering any failure or error in enqueuing an organization migration and/or executing migration steps of the organization migration, a retry logic may be implemented in the organization migration system(s) as described herein to repeat some or all of the affected operations or migration steps up to a maximum retry number, and determine whether the (previously) encountered failure or error can be resolved.

In some embodiments, the migration scheduler (102) includes a migration schedule error handler 128 that operates with other parts of the migration scheduler (102) to provide resilience in scheduling and executing organization migrations. Temporary errors and adverse conditions affecting one or more of the organization migrations may be handled through retries, for example as directed by one or both of the migration schedule engine (104) and the migration schedule executor (0106) automatically. Non-recoverable errors (e.g., exceeding the maximum retry number, etc.) and/or persistent adverse conditions affecting the one or more organization migrations may cause the migration schedule error handler (128) to cancel the failed organization migrations (e.g., marking the state of the organization migrations in one or more corresponding migration schedule records as "Canceled", etc.) and generate migration schedule error alerts 132. The migration scheduler (102) can re-enqueue these organization migrations once conditions causing the previously encountered failures and errors are resolved.

In response to receiving the migration schedule error alerts (132), user(s) can direct the migration scheduler (102) to retry some or all of failed migration steps, ignore some or all of the failed migration steps (e.g., thus proceed with the organization migrations in spite of those ignored unresolved errors/failures, etc.), repeat failed organization migrations, wait for further user input, and so forth.

In some embodiments, the same display page used by a user to request for an organization migration can be used by the user to receive the migration schedule error alters (132), to monitor the current state of the organization migration (e.g., requested, in a preparation state, in a normal execution state, in a state with one or more errors/failures/issues, etc.), and so forth. Additionally, optionally or alternatively, some or all of migration schedule information, statuses, controls, etc., as presented in the display page can be provided through one or more other user interaction mechanisms such as emails, short message services, text or voice messages, mobile apps, logs, acknowledgements, grouped acknowledgments (or gacks), and so forth.

2.2. Multiple Application Servers

In some embodiments, a schedule engine (e.g., 104 of FIG. 1A or FIG. 1B, etc.) runs on a source system instance. In some embodiments, a system instance in a computing system as described herein may be implemented with multiple application servers and multiple underlying database nodes (e.g., RAC nodes, etc.) that provide database services for the multiple application servers to access application data or other related data in designated database partitions.

Multiple application servers for organization migrations may be used. In some embodiments, migration application servers of the same type are fungible. Each of the migration application servers may implement the same or similar migration application logic and can be selected to perform an organization migration. These migration application servers may invoke database services of database servers on database nodes to access data partitions that store application data before and after the organization migrations.

Multiple application servers on the source system instance provides sufficient computing resources for running the schedule engine (104) and other affiliated processes, threads, objects, and so forth. On the other hand, any application node could crash or encounter problems at any time.

In some embodiments, a recoverable and robust mechanism is used to start the schedule engine (104), including but not limited to the other affiliated processes, threads, objects, and so forth. By way of example but not limitation, the schedule engine (104) may be implemented and/or configured as a cron job (e.g., through a datacenter scheduler, etc.). As a result, the cron job may be guaranteed to run with up to only a few second delay even when the schedule engine (104), or any application implementing the schedule engine (104) on an application server, crashes or otherwise fails.

In some embodiments, at most only one cron job representing/implementing the schedule engine (104) is configured to run across all application servers, for example on the source system instance at any given time. If a current incarnation (or a currently running cron job) of the schedule engine (104) runs too long and exceeds a current schedule rune/cycle (e.g., a time period or a cron job interval between two timewise neighboring incarnations of the cron job), the next schedule run/cycle may be skipped.

In a first non-limiting implementation example, running the schedule engine (104) for organization migrations may completely rely on the cron job facility on the source system instance or in a datacenter that includes the source system instance. The cron job interval may be set to a relatively small value such as one (1) minute, three (3) minutes, five (5) minutes, etc. In case that a schedule guardian (e.g., 126 of FIG. 1B, etc.) keeps blocking enqueuing (e.g., target system instance(s) are busy, etc.), a relatively long time period can be used for waiting or re-checking whether enqueuing is unblocked. In some embodiments, logic for such re-checking can be implemented in a while loop and start over in the next schedule run/cycle corresponding to a cron cycle. In some embodiments, the frequency or time interval of the cron cycle may be pre-configured, dynamically configured, adaptively configured, etc.

In a second non-limiting implementation example, the schedule engine (104) can utilize a service (e.g., a scheduled executor service, etc.) to spawn a new thread (e.g., for each organization migration that is being enqueued, etc.) from a thread pool. The new thread(s) for organization migrations that are being enqueued are separate from the cron job thread starting every cron cycle for an incarnation of the schedule engine (104), and can be spawned with a frequency different from (e.g., with a time period shorter than that of, etc.) the cron job thereby providing a relatively fine control on how frequent each retry (e.g., interacting with the schedule guardian (126) to determine whether enqueuing is unblocked, etc.) occurs.

2.3. Multiple Database Nodes

As previously noted, a system instance (or POD) as described herein may use multiple database nodes (e.g., RAC nodes, etc.) to provide database services for application servers to access application data or other related data in designated database partitions of a database. Some computing resources used for organization migrations are shared at a database node level such as the total number of MQ threads, etc. Some computing resources used for organization migrations are shared at the system instance level such as SAN 10, etc. In some embodiments, a schedule guardian (e.g., 126 of FIG. 1B, etc.) may be established for each database node in a plurality of database nodes on the system instance such as a source system instance, a target system instance, etc.

A migration scheduler can access a system view that indicates which data partitions are used to store respective application data of hosted organizations and which database nodes (e.g., RAC nodes, etc.) hosts database servers to access respective data partitions of the database. Thus, for an given organization, the migration scheduler is configured to determine which database node is used to host database servers that process database services to access a data partition (or more than one data partition in some embodiments) in which application data of the given organization is stored and which migration guardian is to be consulted for enqueuing organization migrations with respect to a determined database node.

Migration plans as described herein can be generated based at least in part on a schedule policy (e.g., 124 of FIG. 1B, etc.) by a schedule engine (e.g., 104 of FIG. 1A or FIG. 1B, etc.) in one or more different ways.

Figure 3A:
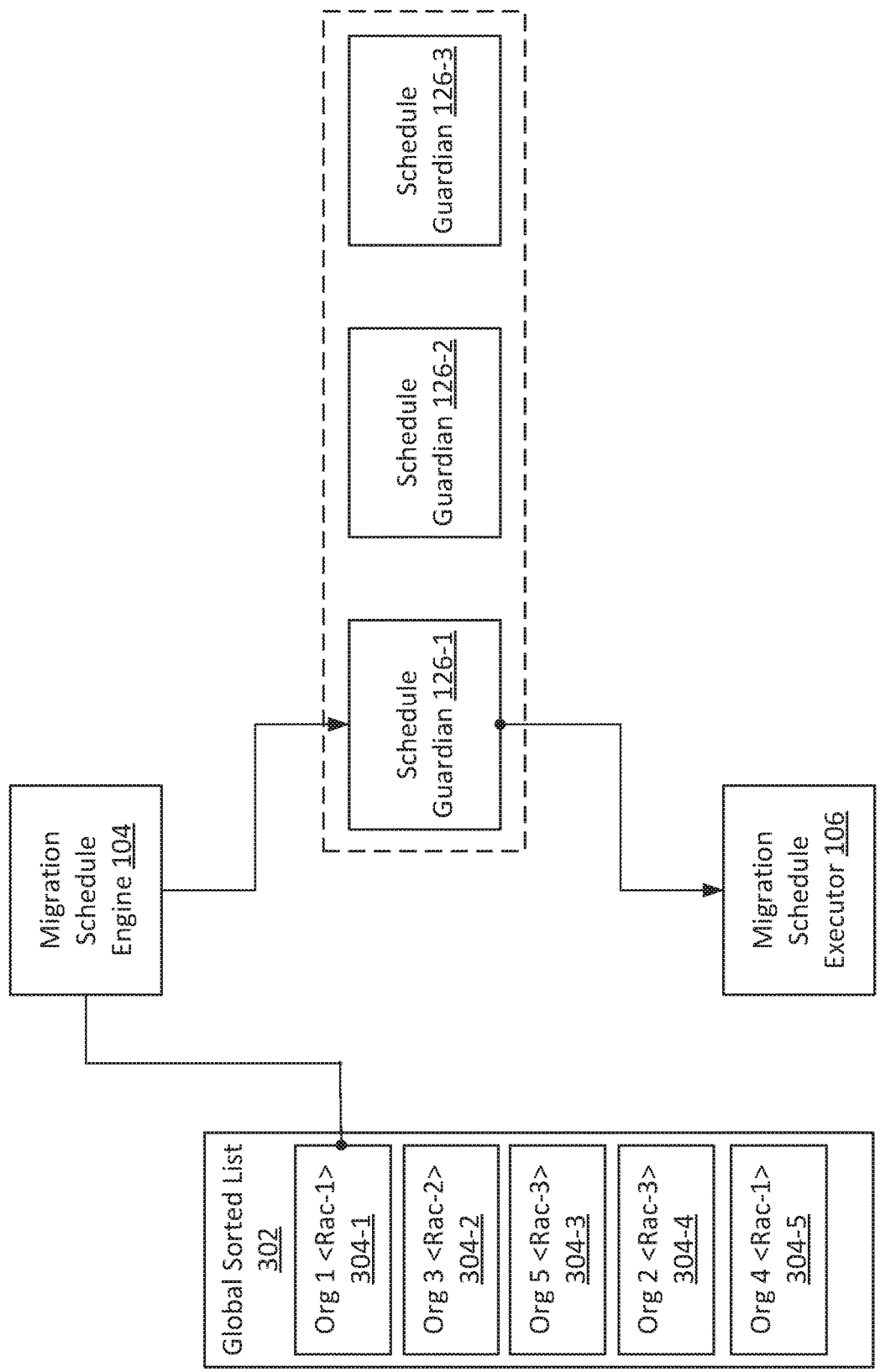
FIG. 3A through FIG. 3C illustrate example operations with global and per-node sorted list.

As illustrated in FIG. 3A, the schedule policy (124) can be used to generate a single global sorted list 302 (e.g., per target system instance, etc.) from (e.g., all, etc.) requested organization migrations (e.g., 304-1, 304-2, 304-3, 304-4, 304-5, etc.) retrieved from a migration data store (e.g., 108 of FIG. 1A or FIG. 1B, etc.) based on one or more query predicates as described herein. In the present example, the requested organization migrations may seek to move five organizations (denoted as "Org 1," "Org 2," "Org 3," "Org 4" and "Org 5") from a source system instance to the same target system instance that uses three database nodes (denoted as "Rac 1," "Rac 2" and "Rac 3," respectively) to provide database services for application servers to access application data or other related data in designated database partitions. The schedule engine (104) may order the requested organization migrations (e.g., 304-1, 304-2, 304-3, 304-4, 304-5, etc.) in the global sorted list from the highest priority to the lowest based at least in part on the migration schedule records and/or the schedule policy (124).

In some embodiments, a schedule guardian (e.g., 126-1, 126-2, 126-3, etc.) may be established for each database node (e.g., "Rac 1," "Rac 2," "Rac 3," etc.) used by the target system instance; application data of the organizations (e.g., "Org 1," "Org 2," "Org 3," "Org 4," "Org 5," etc.) are to be migrated into designated database partitions to be accessed through the database nodes (e.g., "Rac 1," "Rac 2," "Rac 3," etc.), for example by application servers that provide their respective (e.g., organization-specific, organization-common, etc.) application services of these organizations (e.g., "Org 1," "Org 2," "Org 3," "Org 4," "Org 5," etc.).

If a schedule guardian (e.g., 126-1, etc.) indicates that enqueuing is allowed with a database node (e.g., "Rac 1", etc.) used by the target system instance, organization migrations that move application data to designated database partition(s) accessed through the database node can be enqueued from the highest priority to the lowest; once enqueued, these organization migrations are removed from the global sorted list (302). For example, the organization "Org 1" in the requested migration (304-1), which is the highest priority among all the requested migrations, can be enqueued first from the global sorted list (302); once enqueued, the requested migration (304-1) is removed from the global sorted list (302).

Figure 3B:
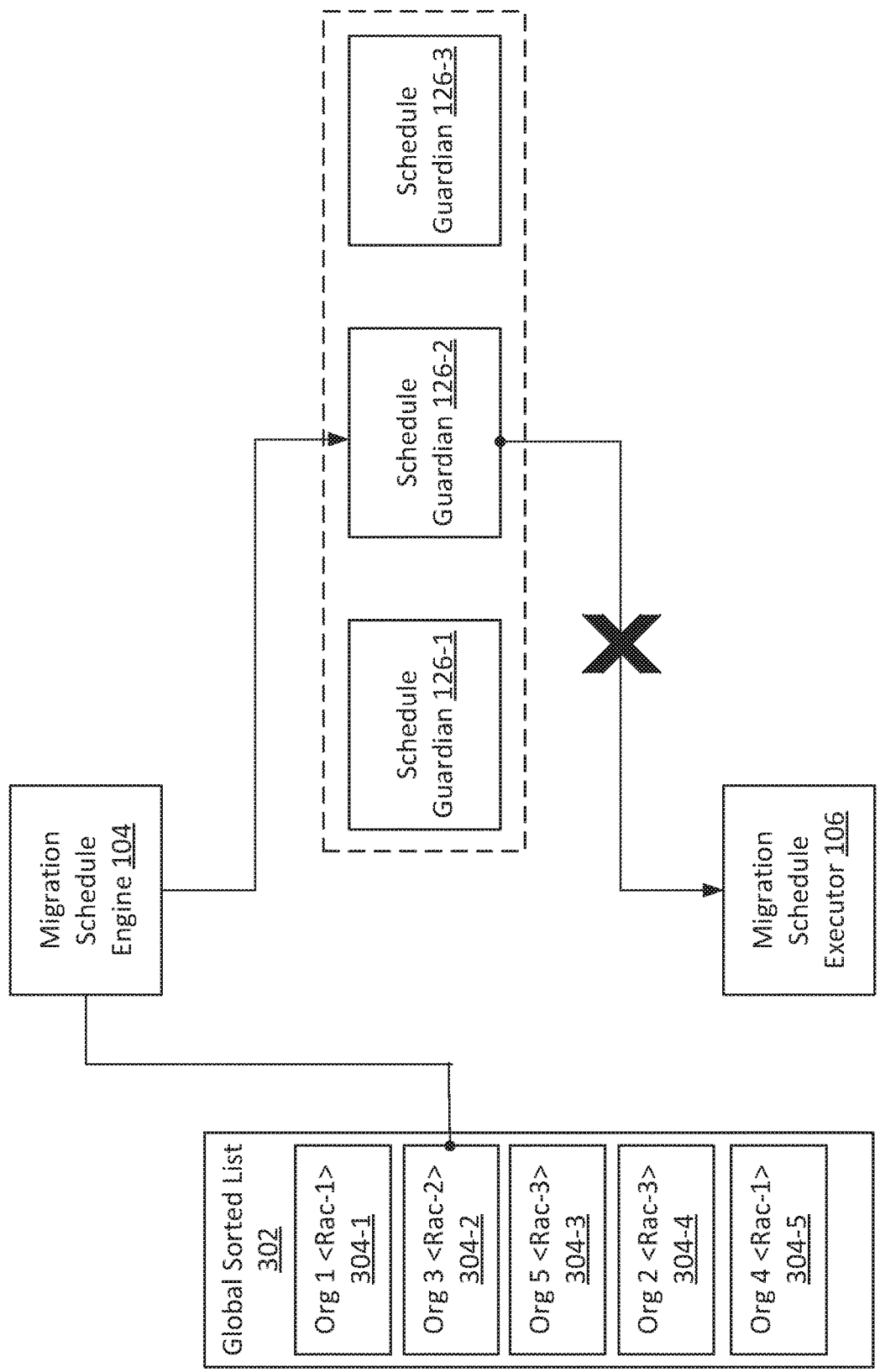

Otherwise, as illustrated in FIG. 3B, if the schedule guardian (e.g., 126-2, etc.) indicates that enqueuing is not allowed with a database node (e.g., "Rac 2", etc.) used by the target system instance, any organization migrations (e.g., 304-2, etc.) that move application data to designated database partition(s) accessed through the database node (e.g., "Rac 2," etc.) of the target system instance, whether or not these organization migrations (304-2 in the present example) are of the highest priorities remaining in the global sorted list (302). Some or all of other organization migrations (e.g., 304-3, 304-4, 304-5, etc.) to other database partition(s) accessed through other database nodes (e.g., "Rac 3," "Rac 1," etc.) used by the target system instance with lower priorities (e.g., the next highest priorities after the previously enqueued and previously skipped, etc.) remaining in the global sorted list may be scheduled if the schedule guardian (126) indicates that enqueuing is allowed with the other database nodes (e.g., "Rac 3," "Rac 1," etc.).

Using this schedule/enqueue logic, the schedule engine (104) can (e.g., attempt to, in normal operating conditions, etc.) enforce the global sorted order across the different database nodes used by the target system instance. The schedule policy (124) can be specifically specified or configured to balance scheduling/enqueuing organization migrations (e.g., relatively evenly distributing the organization migrations) across (e.g., all, each of, etc.) database nodes used by the target system instance to reduce or avoid violating the global sorted order because of overly heavy load in any particular database nodes. When database service loads are not balanced across the database nodes, the global sorted order may or may not be respected. For example, a requested migration of a specific organization (e.g., "Org 3," etc.) may be rejected, if the schedule guardian (e.g., 126-2, etc.) for a database node (e.g., "Rac 2," etc.) used by the target system instance to which application data of the organization ("Org 3" in the present example) is to be migrated indicates that enqueuing with the database node ("Org 3") is currently not allowed. When the database node ("Rac 2" in the present example) recovers, the previously rejected requested migration of the specific organization (e.g., "Org 3," etc.) may be allowed to be enqueued. Thus, in some embodiments, the order in the global sorted list is not strictly enforced when there is any database node (or a schedule guardian therefor) disallowing enqueuing (e.g., including but not limited to the highest priority migrations such as "Org 3" on the list, etc.) while other database nodes due to underutilization may still allow enqueuing (e.g., lower priority migrations such as "Org 4" on the list, etc.). In some embodiments, additional connections may be allocated to accommodate organization migrations that access the same database node and to ameliorate or eliminate the out-of-order problem.

Figure 3C:
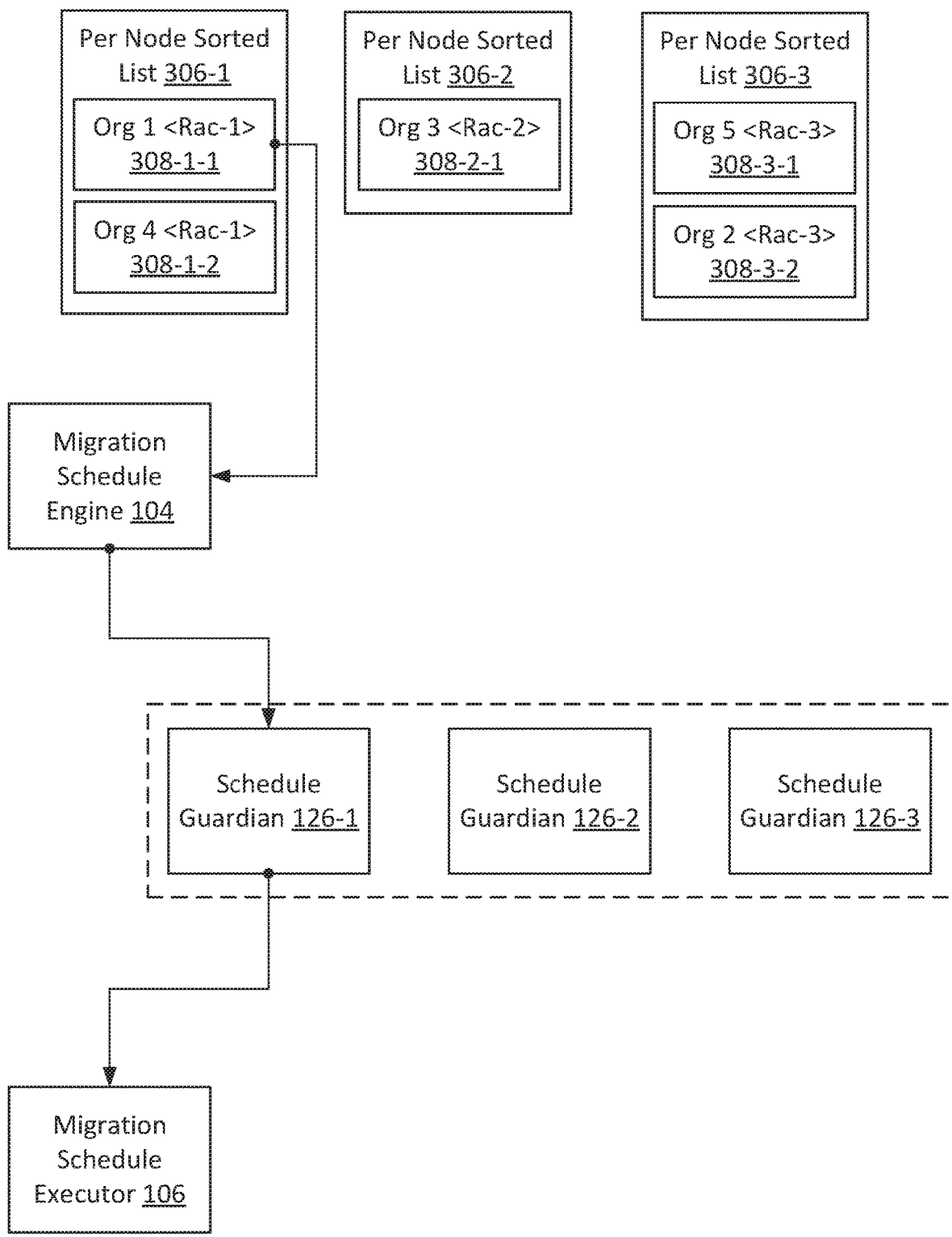

As illustrated in FIG. 3C, the schedule policy (124) can be used to generate per-node sorted list (e.g., 306-1, 306-2, 306-3, etc.) for three database nodes (denoted as "Rac 1," "Rac 2" and "Rac 3," respectively) used by the target system instance from (e.g., all, etc.) requested organization migrations (e.g., 308-1-1, 308-1-2, 308-2-1, 308-3-1, 308-3-2, etc.) retrieved from a migration data store (e.g., 108 of FIG. 1A or FIG. 1B, etc.) based on one or more query predicates as described herein. Similar to the previous example, the requested organization migrations may seek to move five organizations (denoted as "Org 1," "Org 2," "Org 3," "Org 4" and "Org 5") or their respective application data from a source system instance to designated database partitions that can be accessed through the three database nodes. The schedule engine (104) may order the requested organization migrations (e.g., 308-1-1, 308-1-2, 308-2-1, 308-3-1, 308-3-2, etc.) in each per-node sorted list from the highest priority to the lowest based at least in part on the migration schedule records and/or the schedule policy (124).

If a schedule guardian (e.g., 126-1, etc.) indicates that enqueuing is allowed with a database node (e.g., "Rac 1", etc.) used by the target system instance, organization migrations that move application data to designated database partition(s) accessed through the database node as listed in a corresponding per-node sorted list (e.g., 306-1, etc.) can be enqueued from the highest priority to the lowest; once enqueued, these organization migrations are removed from the per-node sorted list (306-1). For example, the organization "Org 1" in the requested migration (308-1-1), which is the highest priority among all the requested migrations in the per-node sorted list (306-1), can be enqueued first; once enqueued, the requested migration (308-1-1) is removed from the per-node sorted list (306-1).

Otherwise, as illustrated in FIG. 3B, if the schedule guardian (e.g., 126-2, etc.) indicates that enqueuing is not allowed with a database node (e.g., "Rac 2," etc.) used by the target system instance, organization migrations that move application data to designated database partition(s) accessed through the database node as listed in a corresponding per-node sorted list (e.g., 306-2, etc.) are not performed.

Using this scheduling/enqueuing logic, the sorted order for each database node can be ensured. However, no global order (e.g., enqueuing "Org 1" before others, etc.) is enforced, even in normal operating conditions in which no database nodes are rejecting enqueuing.

Additionally, optionally or alternatively, a separate list is created to list all organization migrations that should be enqueued before others in addition to per-node sorted lists. For example, at the beginning of a downtime window, schedule guardians for database nodes may not throttle or disallow enqueuing; the organization migrations in the separate list can be completed relatively reliably (or safely) before available computing resource usages are gradually used up or depleted up to the maximum allowable computing resource usages.

For the purpose of illustration, it has been described that organization migrations can be sorted and enqueued based on priority in a sorted list such as a global sorted list for all database nodes that provide database services to a target system instance (or a corresponding source system instance), or per-node sorted lists respectively for the database nodes, or a separate sorted list to list organization migrations that should be performed separately, for example at the beginning of a scheduled downtime window.

It should be noted that in various embodiments, organization migrations can be sorted and enqueued in batches instead of individually. For example, an entry (e.g., any of 304-1 through 304-5, etc.) in a global sorted list (e.g., 302, etc.) as described herein can represent a batch of organization migrations rather than a single organization migration. Similarly, an entry (e.g., any of 308-1-1, 308-1-2, 308-2-1, 308-3-1, 308-3-2, etc.) in a per-node sorted list (e.g., 306-1, 306-2, 306-3, etc.) or a separate list as described herein can represent a batch of organization migrations rather than a single organization migration.

Additionally, optionally or alternatively, sorted lists other than those illustrated here may be used in place of, or in conjunction with any of the global sorted list, the per-node sorted lists, the separate list, and so forth. Additionally, optionally or alternatively, sorted lists may be generated based at least in part on a schedule policy (e.g., 124 of FIG. 1B, etc.) based on other factors in addition to or in conjunction with priorities.

3.0 EXAMPLE EMBODIMENTS

Figure 4:
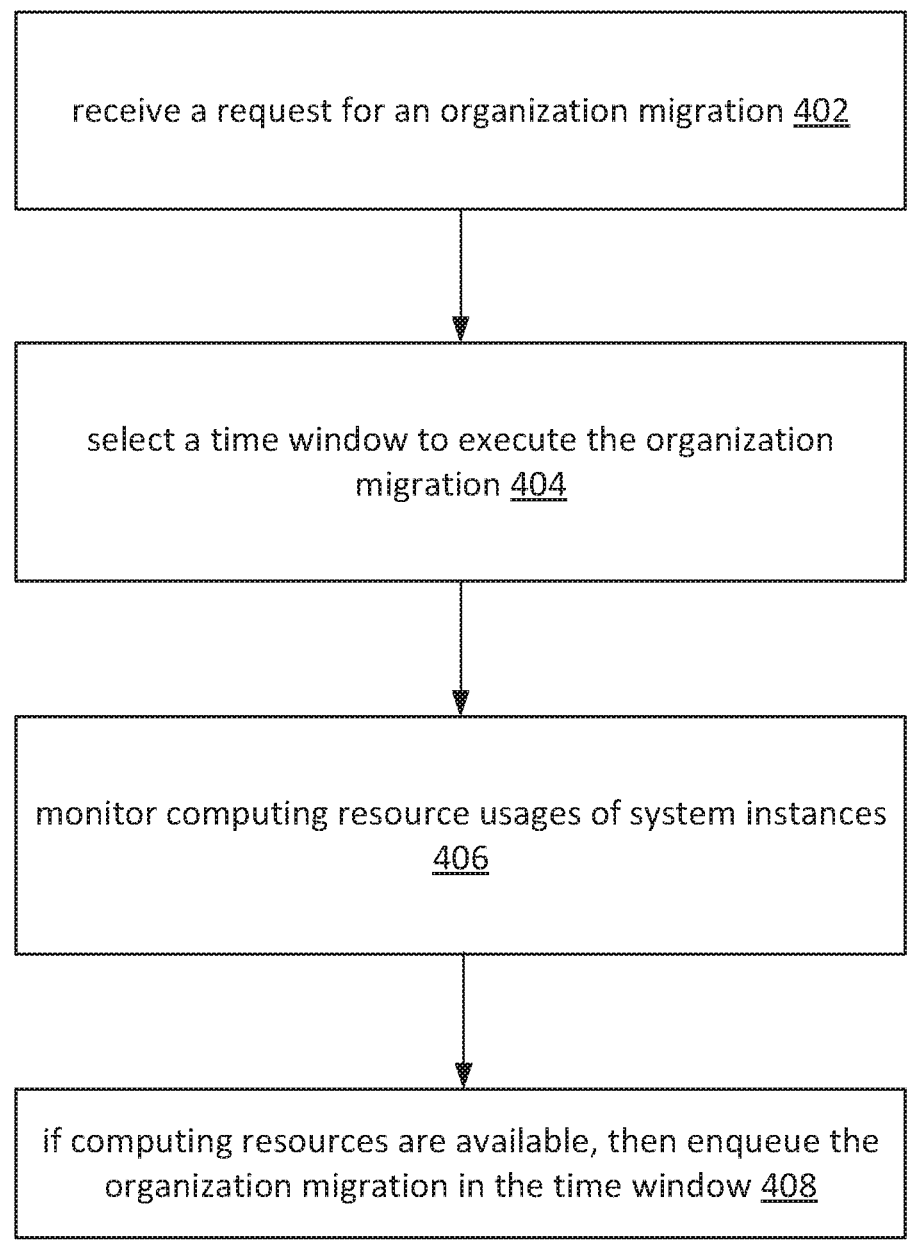
FIG. 4 illustrates an example process flow.

FIG. 4 illustrates an example process flow that may be implemented by a computing system (or device) as described herein. In block 402, a migration scheduler (e.g., 102 of FIG. 1A, etc.) receives a request for an organization migration to move application data and application services of an organization hosted at a source system instance in a multi-tenant computing system to a target system instance in the multi-tenant computing system.

In block 404, based at least in part on operational parameters set forth for the requested organization migration, the migration scheduler selects a time window to execute the organization migration.

In block 406, the migration scheduler monitors computing resource usages of one or both of the source system instance and the target system instance in the multi-tenant computing system in the selected time window.

In block 408, in response to determining, based at least in part on the monitored computing resource usages in the time window, that computing resources are available, the migration scheduler enqueues the organization migration for carrying out migrating the application data and the application services of the organization from the source system instance to the target system instance in the selected time window.

In an embodiment, the migration scheduler is further configured to perform: validating the operational parameters in the request for the organization migration before enqueuing the organization migration.

In an embodiment, the requested organization migration is in a plurality of requested organization migrations that are scheduled to be migrated within the selected time window; two or more requested organization migrations including the requested organization migration are grouped in a batch that is enqueued at one time.

In an embodiment, the plurality of requested organization migrations is grouped into multiple batches with different priorities based at least in part on a schedule policy and respective operational parameters specified for individual requested organization migrations in the plurality of requested organization migrations.

In an embodiment, the organization migration is enqueued in response to determining that enqueuing is allowed with a database node used by the target system instance to provide database services to one or more data partitions designated to host the migrated application data of the organization.

In an embodiment, the migration scheduler is further configured to perform: throttling enqueuing a large number of organization migrations in the selected time window to prevent overloading one or both of the source system instance and the target system instance.

In an embodiment, a migration user is provided with a single user interface to schedule, reschedule, update, delete, or monitor one or more requested organization migrations.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
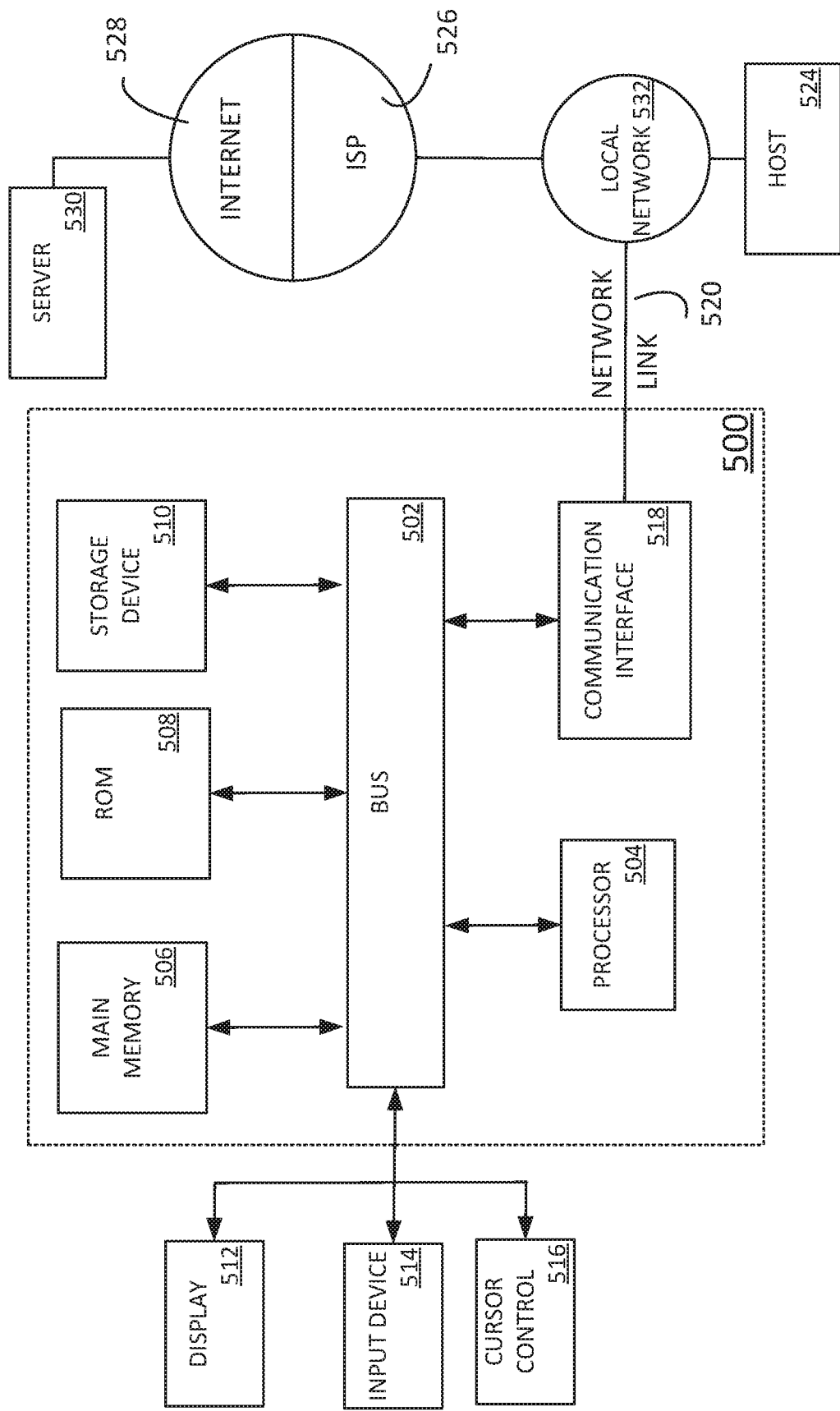
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
receiving a request for an organization migration to move complete application data and application services of a specific organization accessed by first users and hosted at a source system instance in a multi-tenant computing system to a target system instance in the multi-tenant computing system, wherein second complete application data and second application services of a second organization different from the specific organization are accessed by second users different from the first users and hosted at the source system instance;
based at least in part on operational parameters set forth in the request for the requested organization migration, selecting a time window to execute a set of migration specific actions in the organization migration;
monitoring computing resource usages of one or both of the source system instance and the target system instance in the multi-tenant computing system in the selected time window to execute the set of migration specific actions in the organization migration;
in response to determining, based at least in part on the monitored computing resource usages in the time window, that computing resources are available, enqueuing the organization migration for carrying out the organization migration to move the complete application data and the application services of the specific organization from the source system instance to the target system instance in the selected time window while keeping the second complete application data and application services of the second organization in the source system instance;
wherein the requested organization migration is in a plurality of requested organization migrations that are scheduled to be migrated within the selected time window; wherein two or more requested organization migrations including the requested organization migration are grouped in a batch that is enqueued at one time;
wherein the plurality of requested organization migrations is grouped into multiple batches with different priorities based at least in part on a schedule policy and respective operational parameters specified for individual requested organization migrations in the plurality of requested organization migrations.

2. The method as recited in claim 1, further comprising:
validating the operational parameters in the request for the organization migration before enqueuing the organization migration.

3. The method as recited in claim 1, wherein the organization migration is enqueued in response to determining that enqueuing is allowed with a database node used by the target system instance to provide database services to one or more data partitions designated to host the migrated application data of the organization.

4. The method as recited in claim 1, further comprising throttling enqueuing organization migrations in the selected time window to prevent overloading one or both of the source system instance and the target system instance.

5. The method as recited in claim 1, wherein a migration user is provided with a single user interface to schedule, reschedule, update, delete, or monitor one or more requested organization migrations.

6. One or more non-transitory computer readable media storing a program of instructions that is executable by a device to perform:
receiving a request for an organization migration to move complete application data and application services of a specific organization accessed by first users and hosted at a source system instance in a multi-tenant computing system to a target system instance in the multi-tenant computing system, wherein second complete application data and second application services of a second organization different from the specific organization are accessed by second users different from the first users and hosted at the source system instance;
based at least in part on operational parameters set forth in the request for the requested organization migration, selecting a time window to execute a set of migration specific actions in the organization migration;
monitoring computing resource usages of one or both of the source system instance and the target system instance in the multi-tenant computing system in the selected time window to execute the set of migration specific actions in the organization migration;

in response to determining, based at least in part on the monitored computing resource usages in the time window, that computing resources are available, enqueuing the organization migration for carrying out the organization migration to move the complete application data and the application services of the specific organization from the source system instance to the target system instance in the selected time window while keeping the second complete application data and application services of the second organization in the source system instance;

wherein the requested organization migration is in a plurality of requested organization migrations that are scheduled to be migrated within the selected time window; wherein two or more requested organization migrations including the requested organization migration are grouped in a batch that is enqueued at one time;

wherein the plurality of requested organization migrations is grouped into multiple batches with different priorities based at least in part on a schedule policy and respective operational parameters specified for individual requested organization migrations in the plurality of requested organization migrations.

7. The media as recited in claim 6, wherein the program of instructions is executable by a device to further perform: validating the operational parameters in the request for the organization migration before enqueuing the organization migration.

8. The media as recited in claim 6, wherein the organization migration is enqueued in response to determining that enqueuing is allowed with a database node used by the target system instance to provide database services to one or more data partitions designated to host the migrated application data of the organization.

9. The media as recited in claim 6, wherein the program of instructions is executable by a device to further perform: throttling enqueuing organization migrations in the selected time window to prevent overloading one or both of the source system instance and the target system instance.

10. The media as recited in claim 6, wherein a migration user is provided with a single user interface to schedule, reschedule, update, delete, or monitor one or more requested organization migrations.

11. A system, comprising:
one or more computing processors;
one or more non-transitory computer readable media storing a program of instructions that is executable by the one or more computing processors to perform:
receiving a request for an organization migration to move complete application data and application services of a specific organization accessed by first users and hosted at a source system instance in a multi-tenant computing system to a target system instance in the multi-tenant computing system, wherein second complete application data and second application services of a second organization different from the specific organization are accessed by second users different from the first users and hosted at the source system instance;

based at least in part on operational parameters set forth in the request for the requested organization migration, selecting a time window to execute a set of migration specific actions in the organization migration;

monitoring computing resource usages of one or both of the source system instance and the target system instance in the multi-tenant computing system in the selected time window to execute the set of migration specific actions in the organization migration;

in response to determining, based at least in part on the monitored computing resource usages in the time window, that computing resources are available, enqueuing the organization migration for carrying out the organization migration to move the complete application data and the application services of the specific organization from the source system instance to the target system instance in the selected time window while keeping the second complete application data and application services of the second organization in the source system instance;

wherein the requested organization migration is in a plurality of requested organization migrations that are scheduled to be migrated within the selected time window; wherein two or more requested organization migrations including the requested organization migration are grouped in a batch that is enqueued at one time;

wherein the plurality of requested organization migrations is grouped into multiple batches with different priorities based at least in part on a schedule policy and respective operational parameters specified for individual requested organization migrations in the plurality of requested organization migrations.

12. The system as recited in claim 11, wherein the program of instructions is executable by a device to further perform: validating the operational parameters in the request for the organization migration before enqueuing the organization migration.

13. The system as recited in claim 11, wherein the organization migration is enqueued in response to determining that enqueuing is allowed with a database node used by the target system instance to provide database services to one or more data partitions designated to host the migrated application data of the organization.

14. The system as recited in claim 11, wherein the program of instructions is executable by a device to further perform:
throttling enqueuing organization migrations in the selected time window to prevent overloading one or both of the source system instance and the target system instance.

15. The system as recited in claim 11, wherein a migration user is provided with a single user interface to schedule, reschedule, update, delete, or monitor one or more requested organization migrations.

* * * * *